Feb. 22, 1955     W. L. PUGH ET AL     2,702,543
SURGICAL FRACTURE FIXATION DEVICE FOR THE HIPS
Filed Nov. 28, 1952
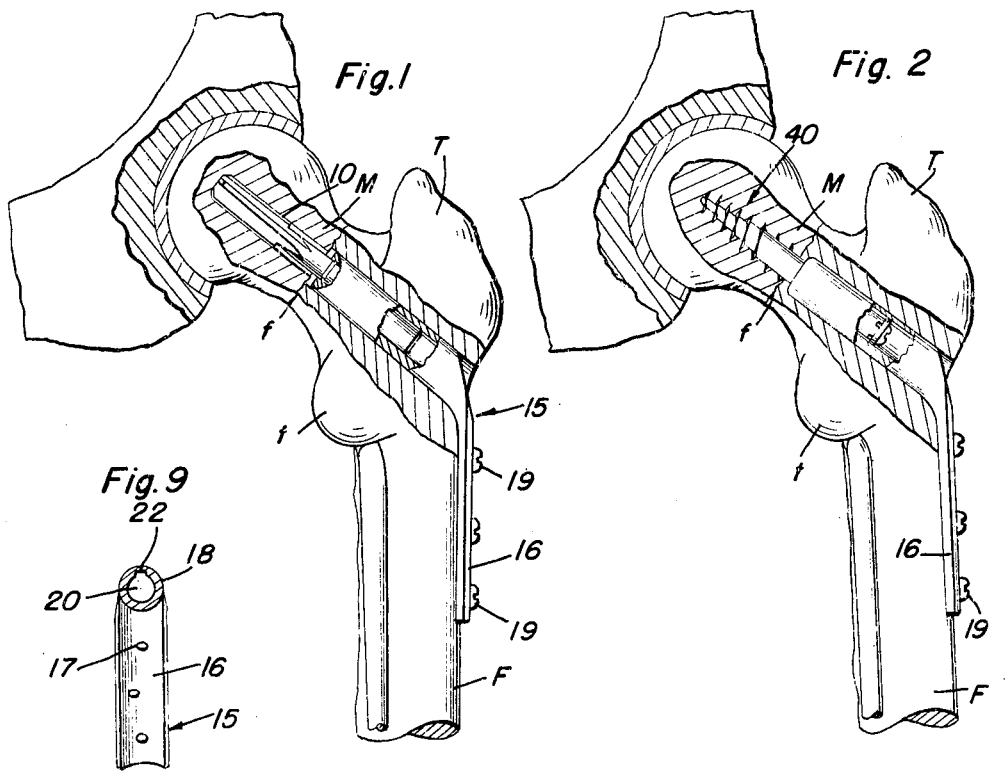
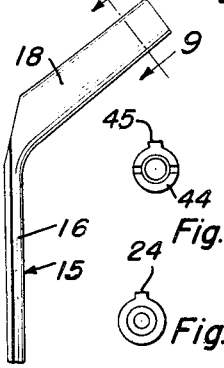
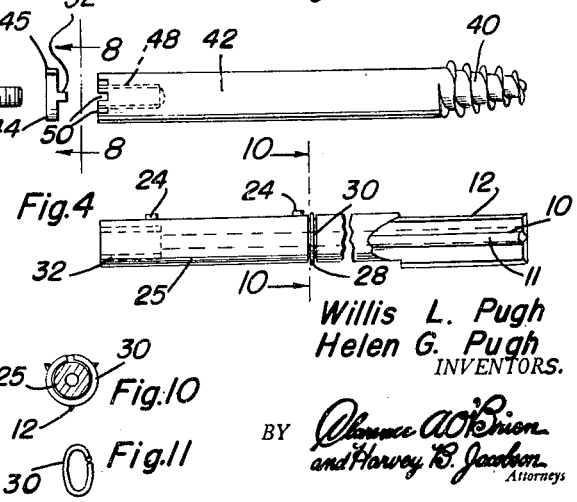
Willis L. Pugh
Helen G. Pugh
INVENTORS.

United States Patent Office 2,702,543
Patented Feb. 22, 1955

2,702,543

SURGICAL FRACTURE FIXATION DEVICE FOR THE HIPS

Willis L. Pugh and Helen G. Pugh, Evansville, Ind.; said Willis L. Pugh assignor of forty per cent to said Helen G. Pugh and ten per cent to Joe Vol Butt Application November 28, 1952, Serial No. 322,972

5 Claims. (Cl. 128—92)

This invention relates to surgical devices and it has special reference to a surgical fracture fixation device for the hip producing an internal fixation of fractured bones, the most frequent application of a device of this type being that to fractures of the femoral neck and to intertrochanteric or subtrochanteric fractures of the femur.

For the fixation of fractures of this type nails and lag screws have been used for holding the fractured parts in the correct position to each other producing impact, but it has been found that such devices in many cases do not maintain permanent impact of the fractured surfaces and therefore impair or prevent the healing of the fracture. The failure to hold the surfaces of the fractured bones permanently in their correct position is partly or mainly due to the influence of certain processes within the body of the injured person and it has therefore been proposed to hold the nails or lag screws by means of a base plate which is firmly secured to the uninjured portion of the bone.

It has however been found that this only partly solves the problem of maintaining a permanent impact of the surfaces at the fractured site as such a plate prevents movement in one direction but acts as a reaction receiving support and therefore produces movement in the opposite direction.

It is the object of the present invention to provide a self-adjusting fixation which firmly holds the nail or screw of the fixation but which also permits said nail or screw to adjust its position with respect to the holding plate thus maintaining the surfaces in impact for an indefinite length of time.

It is a further object of the invention to provide a self-adjusting fixation means which will prevent any movement between the fractured parts and which will especially also prevent rotational movement around the longitudinal axis of the nail or lag screw notwithstanding the fact that the nail or screw is held by the plate in an adjustable manner.

It is a further object of the invention to provide a construction which will especially reduce the number of nails or screws to be held on stock by the surgeon in order to suit different conditions.

It is a further object of the invention to provide a device which is easily adjustable and which may be manipulated by the surgeon with greater ease than those devices which have been hitherto used.

It is a further object of the invention to provide an adjustable device of the type aforedescribed the self-adjusting mechanism of which is so combined with the nail or screw that no additional parts are necessary or must be held in stock in order to produce the self-adjustment.

Further and more specific objects of the invention will be apparent from the following detailed specification.

The invention is illustrated in the accompanying drawing which, partly in a diagrammatic manner, illustrate the application of the invention. It is however to be understood that the invention has been illustrated by way of example only in order to explain the principle of the invention and the best mode of applying said principle. The example shown is adapted for specific cases and a departure from the example which has been shown is therefore not necessarily a departure from the principle of the invention.

In the drawing:

Figures 1 and 2 are somewhat diagrammatic sectional elevational views, illustrating the operation of the device and showing a partly sectional view of the femoral head supposed to be fractured with the device in place for holding the fractured parts.

Figure 3 is an elevational view of a base plate for the nail or lag screw.

Figure 4 is an elevational view of the nail.

Figure 5 is an end view of one side of the nail.

Figure 6 is an end view of the other side of the nail.

Figure 7 is an exploded elevational view of all the parts of a lag screw.

Figure 8 is an end view seen in the direction of the arrows 8—8 of the ring or washer which is connected with the lag screw.

Figure 9 is a partly sectional view of the plate the section being taken along the line 9—9 of Figure 3.

Figure 10 is a sectional elevational view through the nail shown in Figure 4, and Figure 11 is a view of the elastic expansible friction producing ring which is used in connection with the nail.

To explain the general principle on which the invention is based, it may be mentioned that with bone fractures of the type mentioned, especially fractures of the femoral neck, or with intertrochanteric or with subtrochanteric fractures, healing can only occur if the fractured bones are joined and held in that position. A rigid fixation of the fractured bones is therefore necessary. Such a rigid fixation is usually provided by means of a nail or screw driven into those parts of the bone fixation of which is intended. Such nails or lag screws are widely used but were not always found to be quite adequate, as in the course of time when absorption takes place near the fractured surfaces internal forces act on such a nail or screw which is therefore driven out of the bone which it is supposed to maintain in its position.

The invention intends to maintain the conditions of fixation notwithstanding the changes due to absorption by providing a nail fixed in such a manner that its fixation is sufficient even during phases during which the nail is not firmly held in the bone fragment, while on the other hand a sliding movement of the nail or screw in a longitudinal direction is permitted under the influence of slowly acting superior forces. While freedom of movement in a longitudinal direction is permitted the freedom of a rotational movement around the longitudinal axis of the nail is however suppressed. A full freedom of movement in longitudinal direction is not advisable and may be of disadvantage. The nail should be held in its position mechanically and only the slow movement which is due to the absorption at the fracture site and to the forces produced while such absorption occurs should be able to displace the nail in a longitudinal direction.

With these general principles in view the invention will be readily understood by referring to Figures 1 and 2 of the drawings showing diagrammatically, but not accurately with respect to anatomical details, the upper part of a femur indicated at F which has been fractured either near the neck, as indicated by way of example by means of the broken lines f, or at some other place in this general area and near the trochanters T, t, the fracture being for instance intertrochanteric or subtrochanteric.

In the figures the medullary canal in the bone is indicated at M.

The fixation device according to the invention consists in a nail 10 with three fins 12 arranged at 120° of each other and projecting from a central hollow cylindrical stem portion 11, the nail being thus very similar to the "Smith-Peterson" nail. The nail according to the invention differs from the known nail only in its lower part 25 and by the way its connection is made with the plate 15. The plate member 15 has a shank or strap portion 16 which is curved and concave on the side on which it is in contact with the femur in order to conform itself to the shape of the bone to which it is attached as closely as possible. This strap portion or shank 16 is provided with a number of counter-sunk holes 17 through which screws 19 pass which fix the strap portion to the bone structure. On the upper side this strap portion is provided with a tubular holder 18 set at an angle with respect to the strap portion which corresponds to the average angle at which the device is set relatively to the plate. The construction of the plate 16 thus corresponds to the usual plate construction except for the circumstance that the tubular portion 18 is much longer than the socket portion in the usual type of fixation.

The inner bore 20 of the tubular section 18 also has a longitudinal groove 22 for a purpose to be described.

The nail construction differs from known constructions only in its lower portion 25 which is held in the tubular part of the plate. Essentially the lower portion of the nail is of smooth cylindrical shape and it enters into and fits the bore 20 of the tubular holder 18 of the plate. Its diameter is approximately equal to that of the tubular portion 18 of the plate. The finned portion of the nail is thus much shorter than the finned portion in the conventional nail and it is essentially confined to the top portion which enters the bone structure. The cylindrical portion of the nail essentially lies within the medullary canal M when the nail is seated. The smooth cylindrical portion 25 of the nail is provided with a number of aligned projecting studs or rivets 24 which when the nail is inserted into the tubular portion 18 slides within the groove 22 of the bore of the tubular holder. These rivets or pins fill the groove 22 and thus prevent a rotational movement of the nail within the holder.

The smooth cylindrical portion of the nail is moreover provided with a circumferential groove 28 within which an elastic expansible split collar or ring 30 is held. When the cylindrical nail portion 25 is inserted into the bore 20 of the tubular holder 18 the expansible ring is pressed against the holder and therefore the nail is firmly held by friction against longitudinal displacement. However, this frictional holding of the nail is not sufficiently strong to prevent the nail from being displaced under the influence of the slowly acting but strong forces which arise whenever absorption takes place and which have a tendency to drive the nail back towards the plate. The nail, under the influence of these forces, yields to the pressure which therefore causes the longitudinal advance of the nail within the tubular holder. The fixation is thus sufficiently strong to withstand any tendency to shift the fractured surfaces, but is sufficiently yielding to permit adjustment to the slowly acting superior pressure, thus avoiding the penetration of the nail into the bone (and sometimes even through the bone) when fixedly held by the plate.

The circumferential groove 30 is preferably made of such depth that the split expansible elastic ring may be permanently lodged in it so that it forms part of the nail structure.

The bottom portion of the nail may be provided with a screw threaded bore 32 or with some other means for fixing it permanently within the tubular holder of the plate, when such permanent fixation is desired.

Instead of nails lag screws 40 (Figures 2, 7 and 8) are sometimes used which essentially are conical screws provided with a sharp helix forming a helical conical knife blade which is fixed in the bone by screwing it in. The lag screw 40 is also mounted on a cylindrical body 42 which is accurately fitted into the tubular holder 18 of the fixation plate 15. The cylindrical portion in this case may not be provided with studs or rivets but fixation against rotational movement may be obtained by means of a special ring or washer 44 provided with a suitable key-like projecting feather 45 which is fixed in the lag screw by means of a screw bolt 46 held in a suitably threaded axial bore 48 provided in the bottom portion of the lag screw 40.

The end of the said cylindrical portion may moreover be provided with regularly disposed axial cuts or indentations 50 which are engaged by a tooth or by teeth 52 projecting from the ring or washer 44. The feather 45 engages a longitudinal groove 22 of the tubular holder. When the surgeon has fixed the lag screw and the plate 15 he can bring the projecting feather 45 into the proper position within the holder by turning the ring or washer before fixing it on the lag screw so as to avoid any readjustment of the lag screw after it has been put into place. Fixation is obtained by means of the screw 46 which passes through a suitable bore within the member 44 and engages the threads of the threaded bore 48.

The lag screw may be left without any fixation against longitudinal shifting such as shown in connection with the nail or may be provided with such a fixation. The type which is used must be selected by the surgeon in accordance with existing conditions.

It is thus seen that the invention provides a notable improvement of the usual fixation nail and lag screw on the base plate. This improvement consists in the arrangement of a nail which is firmly held in place by the plate but which is longitudinally yieldable against stress and which is therefore held in place only by a limited force, so that the slowly acting superior forces due to the tendency of displacing the nail as a consequence of absorption are capable of readjusting the position of the nail in a longitudinal direction while at the same time the rotational movement of the nail is completely suppressed.

The new nail thus permits to avoid many situations which lead to non-union of the fractured bones and thus permit to reduce a number of cases of non-union to a marked extent.

With an intertrochanteric or subtrochanteric fracture where the danger of driving the nail either backwardly or, if a plate is used, outwardly is much lessened, the invention has still the advantage of avoiding the necessity of keeping nails of different lengths in stock. As the position of the nail or screw is adjustable within the tubular holder of the plate the number of nails or screws which must be held on stock to fit the various cases and sizes is thus markedly reduced. This is a decided advantage for the manufacturer as well as for the hospital for which the keeping of large stocks is a burden.

It will be clear that unessential changes in the construction may be made without in any way departing from the essence of the invention as defined in the annexed claims.

What is claimed as new is as follows:

1. A surgical device for the fixation of fractured bones, comprising a fixation member having a section provided with means for firmly embedding themselves into a fractured portion of the bone and a guiding section, a base member adapted to be fixed to another portion of the fractured bone, said base member being provided with a tubular guide sleeve, encircling and guiding the guiding section of the fixation member for longitudinal movement, said guide sleeve being of sufficient length to prevent binding of the fixation member under lateral stress so that longitudinal movement of the guiding section in the guide sleeve may occur, a device producing a controlled frictional resistance, inserted between the guide section of the fixation member and the guide sleeve, producing a predetermined resistance against longitudinal displacement, normally blocking the longitudinal movement of the guiding section of the fixation member within the guide sleeve, while at the same time yielding to slowly acting superior forces exceeding the predetermined resistance limit, engendered during the healing process, thus keeping the bone fragments in operative contact with each other and holding the fixation member in its position during all phases of the process and under varying healing conditions.

2. A surgical device for the fixation of fractured bones as claimed in claim 1, wherein the fixation member consists of a lag screw with a helical bone gripping section, the guiding section consisting of a cylindrical stem, the latter being provided with axial indentations at its end, a washer provided with an axial projection engaging one of said indentations, said washer being also provided with a radially projecting member fitting into the longitudinal channel, and fixation means fixing said washer to said stem.

3. A surgical device for the fixation of fractured bones comprising a base plate with a strap member adapted to be fixed to the fractured bone, provided with a tubular holder arranged at an angle relatively to the base plate, a fixation member provided on one end with means for gripping and holding a fractured portion of the bone and provided at its other end with a stem longitudinally slidable in the holder of the plate, frictional means for fixing the position of the stem within said holder, said means including an expansible ring mounted on said stem and pressed against said holder, the pressure of the ring against the holder producing limited resistance holding the fixation member in its place but adapted for a longitudinal adjustment against resistance to secure impact of the fractured surfaces in the case of absorption.

4. A surgical device as claimed in claim 3 wherein the stem of the fixation member is provided with a circumferential groove, the elastic expansible ring being held within said groove, thus forming a permanent friction member on the said stem.

5. A surgical device for the fixation of fractured bones as claimed in claim 3 wherein the holder of the plate is provided with a longitudinal channel and the stem is provided with a projecting member engaging said channel for preventing rotation of the fixation member.

References Cited in the file of this patent

UNITED STATES PATENTS

| | | |
|---|---|---|
| 2,397,545 | Hardinge | Apr. 2, 1946 |
| 2,612,159 | Collison | Sept. 30, 1952 |
| 2,621,653 | Briggs | Dec. 16, 1952 |
| 2,628,614 | Briggs | Feb. 17, 1953 |

OTHER REFERENCES

The Journal of Bone and Joint Surgery for July 1953, vol. 35A, advertising page 6. (Copy in Scientific Library.)